(12) United States Patent
Kapusky et al.

(10) Patent No.: US 10,829,007 B2
(45) Date of Patent: Nov. 10, 2020

(54) ACTIVE LONG TRACK COVER

(71) Applicant: Adient Engineering and IP GmbH, Burscheid (DE)

(72) Inventors: Michael Kapusky, South Lyon, MI (US); Shreyas Sansuddi, Ann Arbor, MI (US); Joseph A. Wolkowicz, Livonia, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 15/881,121

(22) Filed: Jan. 26, 2018

(65) Prior Publication Data

US 2020/0276918 A1    Sep. 3, 2020

(51) Int. Cl.
    *B60N 2/07*    (2006.01)

(52) U.S. Cl.
    CPC ......... *B60N 2/0725* (2013.01); *B60N 2/0715* (2013.01); *B60N 2/0732* (2013.01)

(58) Field of Classification Search
    CPC .. B60N 2/0725; B60N 2/0715; B60N 2/0732; B60R 9/052
    See application file for complete search history.

(56) References Cited

U.S. PATENT DOCUMENTS

| | | | | |
|---|---|---|---|---|
| 4,376,543 A * | 3/1983 | Sakagami | ............... | G05G 25/04 |
| | | | | 277/345 |
| 4,979,702 A * | 12/1990 | Franklin | ................ | A44B 19/26 |
| | | | | 24/385 |
| 5,228,659 A | 7/1993 | Potes, Jr. et al. | | |
| 6,145,911 A | 11/2000 | Sturt et al. | | |
| 6,182,773 B1 * | 2/2001 | Borgman | .................. | E21B 7/02 |
| | | | | 175/209 |
| 6,511,032 B1 | 1/2003 | Lee | | |
| 7,073,764 B2 | 7/2006 | Matsushiro | | |
| 7,350,853 B2 * | 4/2008 | Fitze | ...................... | B62D 25/20 |
| | | | | 296/184.1 |
| 8,393,590 B2 | 3/2013 | Kato et al. | | |
| 9,399,413 B2 | 7/2016 | Phinney | | |
| 2005/0046158 A1 * | 3/2005 | Abe | .................... | B60R 21/2165 |
| | | | | 280/730.1 |

(Continued)

OTHER PUBLICATIONS

RISEANDSCI, "Bugatti factory mechanical track", Video, https://www.reddit.com/r/engineering/comments/3j8k2e/bugatti_factory_mechanical_track_xpost_rgifs/, Sep. 1, 2015.

*Primary Examiner* — Christopher Garft
(74) *Attorney, Agent, or Firm* — McGlew and Tuttle, P.C.

(57) ABSTRACT

A vehicle seat assembly with a long track that significantly extends beyond the seat. The track defines a slot. A carriage is movable along the track through the slot. A cover is mounted on the track, and includes a plurality of fingers being individually pivotally connected to the track between a cover position and an open position. Each finger in the cover position blocking a portion of the slot from the area outside of the track. Each finger in the open position opening a respective portion of the slot to the area outside of the track. The plurality of fingers and the longitudinal edges of the extension being shaped configured to move the plurality of fingers from the cover position to the open position as the carriage moves along the track and against the plurality of fingers.

20 Claims, 6 Drawing Sheets

(56) References Cited

U.S. PATENT DOCUMENTS

| | | | |
|---|---|---|---|
| 2007/0170743 A1* | 7/2007 | Kinoshita | B60N 2/0818 296/65.13 |
| 2014/0091610 A1* | 4/2014 | Clark | B60N 2/07 297/463.1 |
| 2014/0265463 A1* | 9/2014 | Phinney | B60N 2/0725 297/182 |
| 2015/0225066 A1* | 8/2015 | Hanna | B64C 1/20 244/122 R |
| 2015/0225067 A1* | 8/2015 | Hanna | B64C 1/20 244/122 R |
| 2016/0082892 A1* | 3/2016 | Ferman | B60R 9/05 224/322 |

* cited by examiner

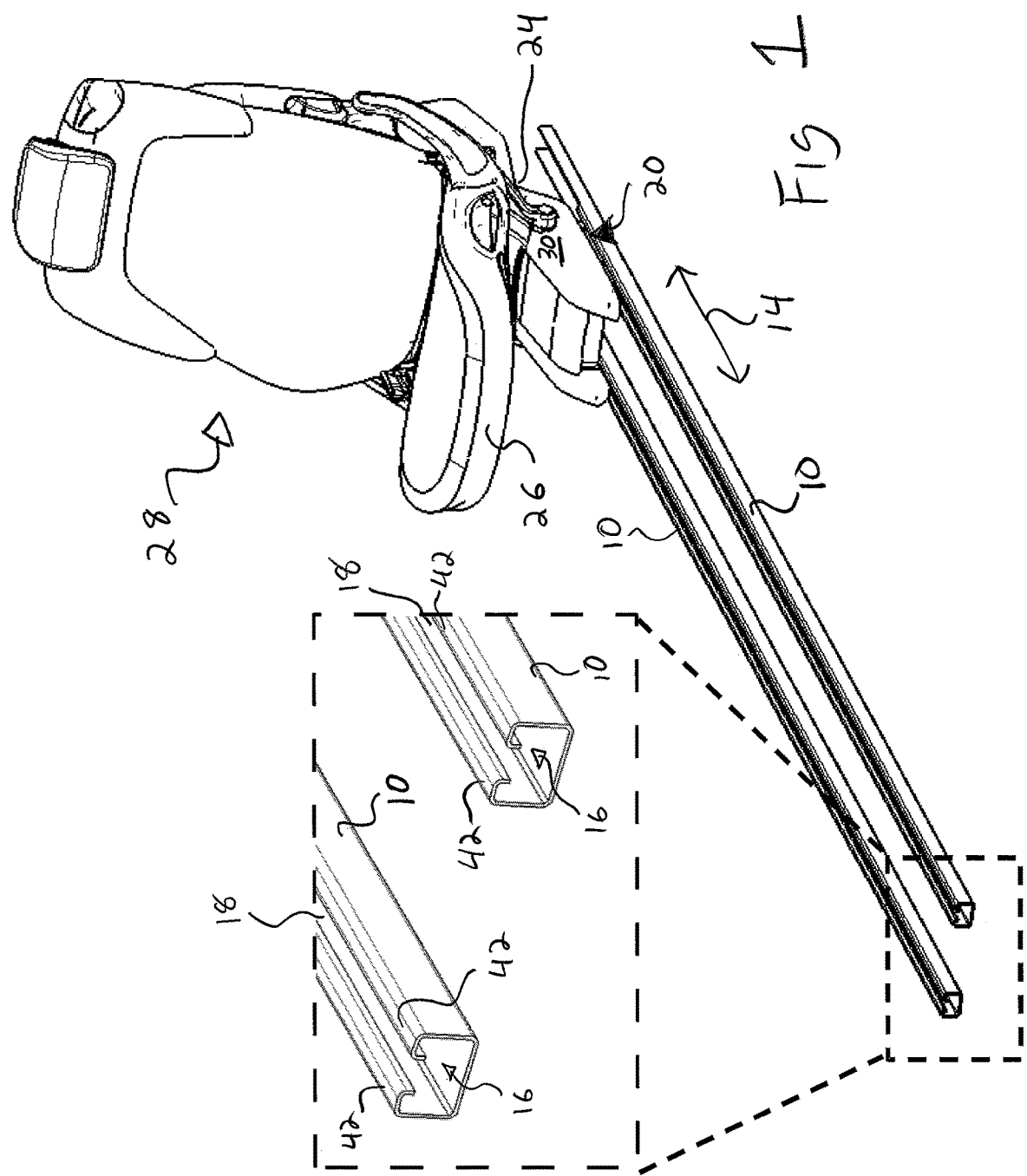

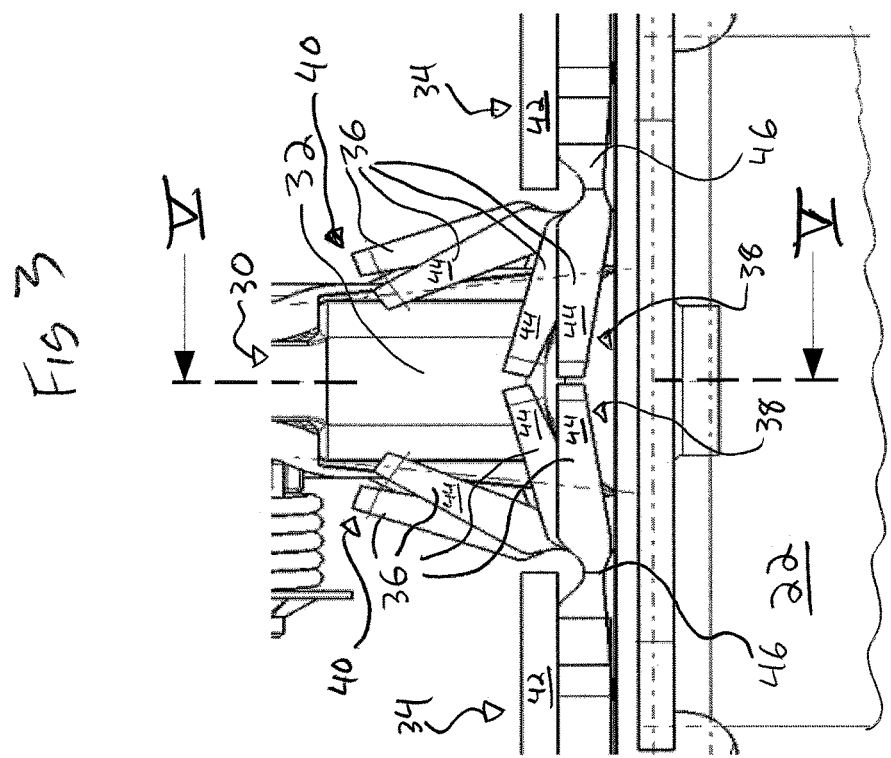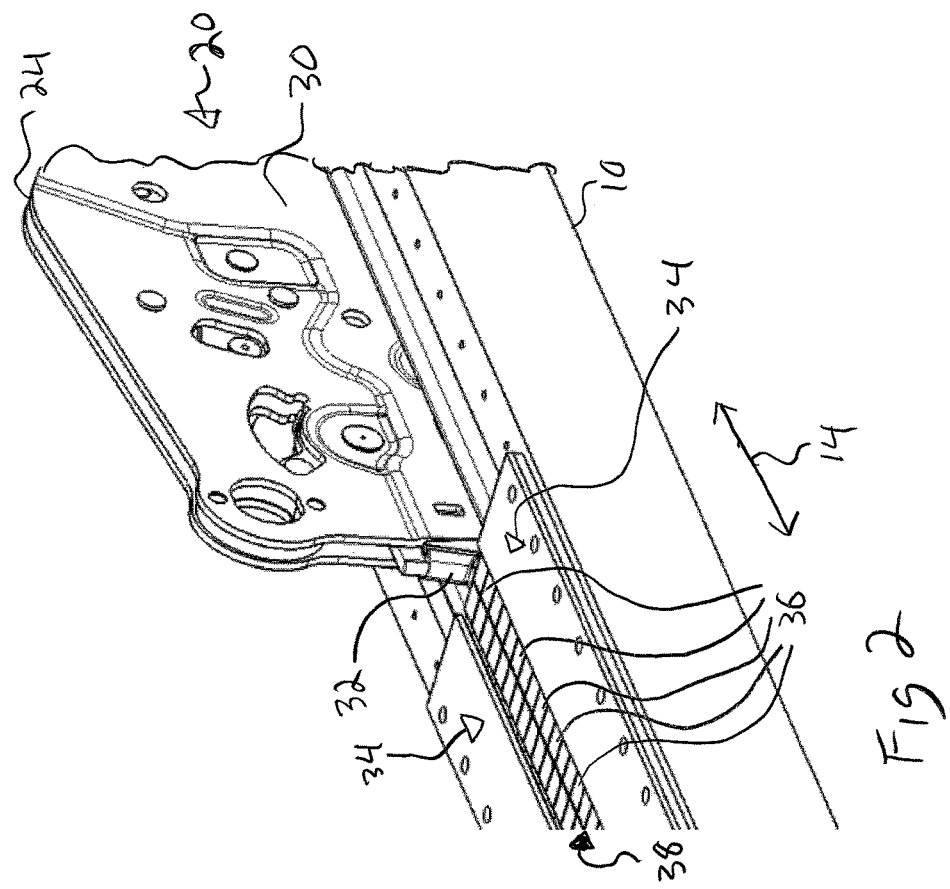

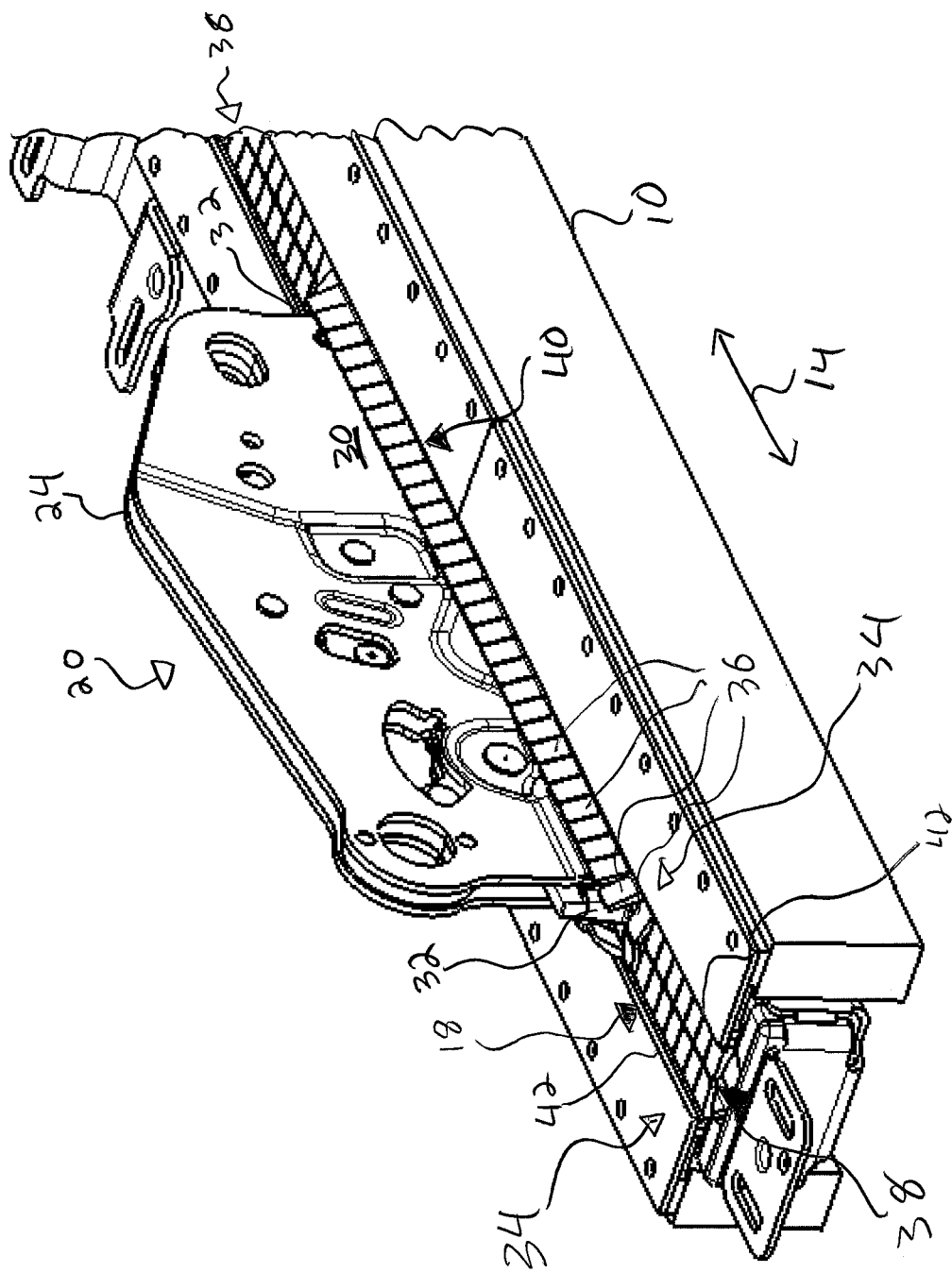

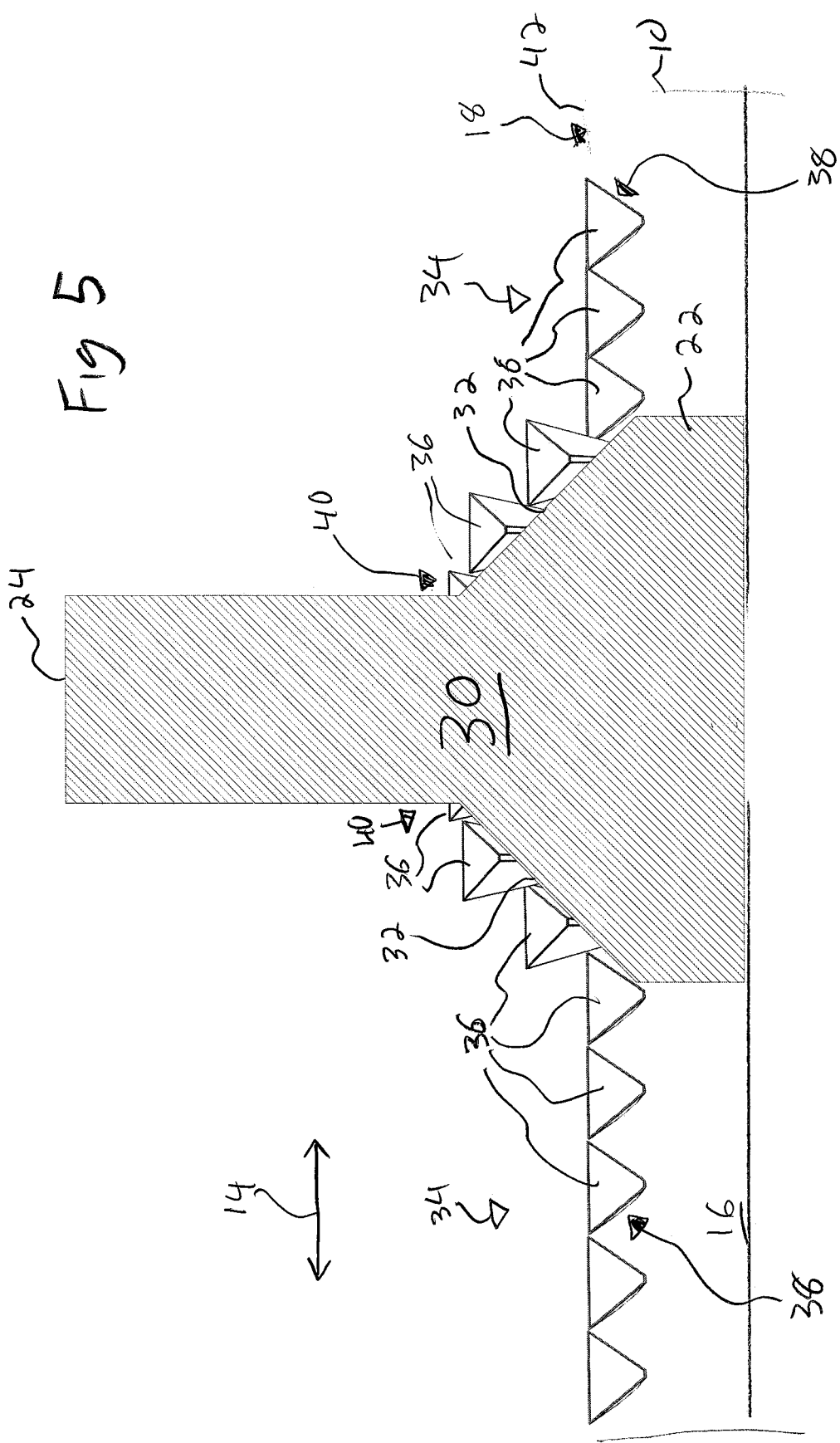

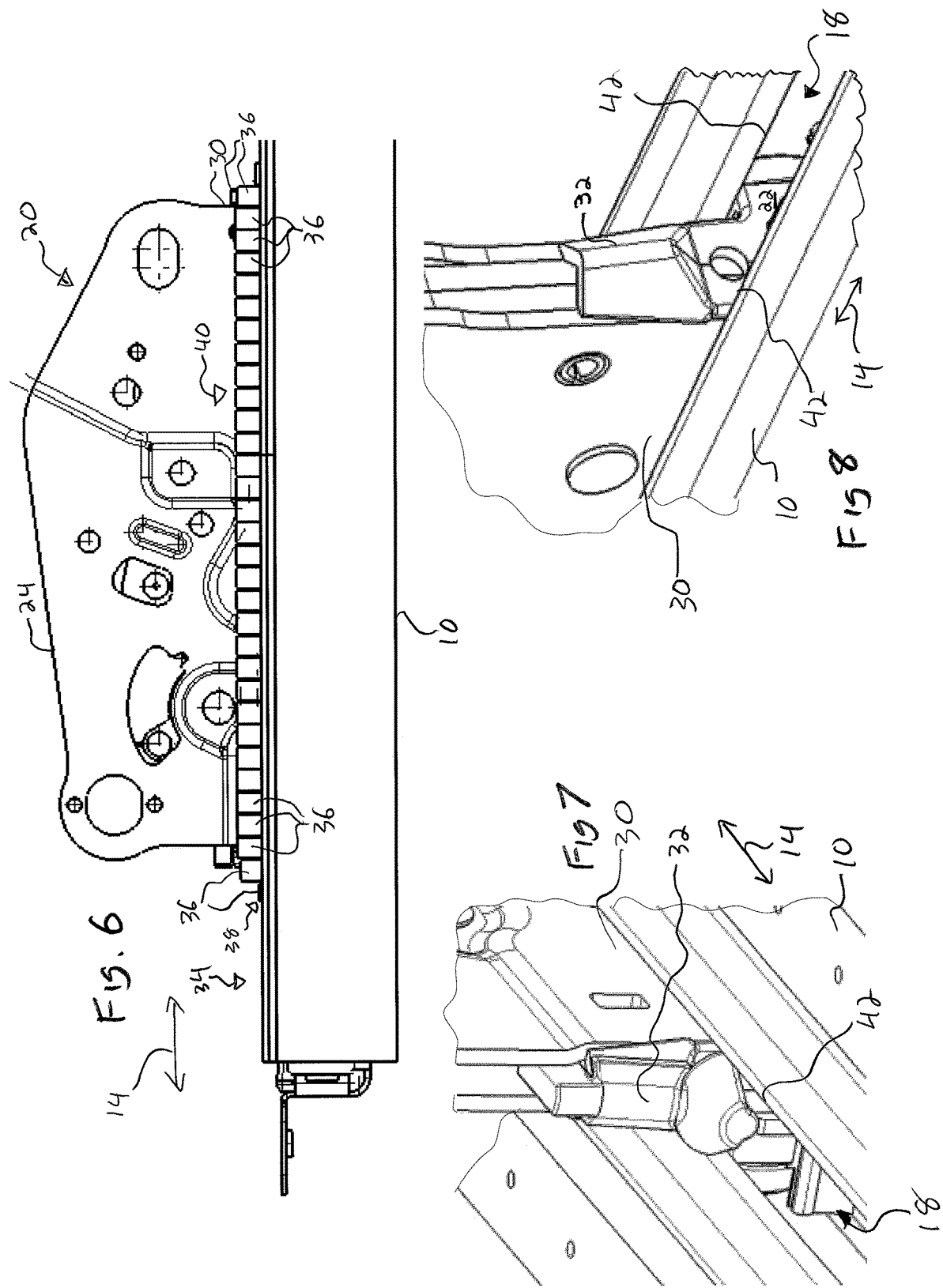

ACTIVE LONG TRACK COVER

FIELD OF THE INVENTION

The present invention relates to a sliding seat in a vehicle, and in particular to the track, the carriage that slides in the track, and the seat that is supported by the carriage.

BACKGROUND OF THE INVENTION

Seats are preferably slidable in vehicles in order to accommodate people of different sizes. This is especially true for the driver's seat, since occupants of different sizes will need the seats at different positions to best handle the controls of the vehicle. The front passenger seat is also often made slidable, in order to give the front passenger more or less leg room. If there is no rear passenger, the front passenger seat can be slid more rearward, to give the front passenger a large amount of leg room. If there is a rear passenger, the front passenger seat is often slid forwards or backwards, to divide up the desired amount of leg room for the front and rear passenger.

Often, the amount that the seats were slidable forward and rearward, is limited to accommodate the range of different sizes for most of the people driving the car, and to accommodate most of the desired variations in leg room. The seats were made slidable by providing a track on the floor of the vehicle, and the seat would be supported by a carriage that would slide in the track. Since there was limited amount of sliding distance, these tracks could mostly be contained under the seat where the seat would block the view of the track. Such limited tracks would not interfere with many other activities in the vehicle because the track was mostly under the seat. Furthermore, the seat would protect the track from debris interfering with the track.

Vehicles can be made more versatile by having the seats slide for greater distances. It is specially versatile for all of the seats in some vehicles to move as far forward as possible, and as far rearward as possible over the entire passenger compartment. For example, a vehicle with three rows of seats, or two rows of seats and a storage space behind the last row, can be more versatile if all the passenger seats can be moved all the way to the rear, or all the way to the front of the passenger compartment. This allows the vehicle to convert between predominately carrying passengers, predominately carrying cargo, or somewhere in between. The amount of cargo space can be adjusted depending on the number of passengers. This is especially true if the seats can be folded into a more compact size. When the seats are folded into a compact size, and all the seats are shifted to the front or the rear of the passenger compartment the seats can be arranged in almost a stacked formation which is a very efficient use of space. Also if a vehicle can be used in an autonomous driving mode, the driver's seat can also be moved to the rear. Which provides even more cargo space.

Providing a vehicle where the seats can be slid forward or rearward to a greater extent than traditional seats, can be done by providing a longer track. One possibility is to provide a track that runs the full length of the sliding travel desired for the seats, usually the entire length of the passenger compartment, and for all the seats in one front to rear column to slide on the one track, or set of tracks. A disadvantage of such a track, or set of tracks, is that the track(s) are then not covered by the seat, and the track then is exposed to the other activities inside the passenger compartment. This can be unsightly, and interfere with activities in the passenger compartment. Debris from activities in the passenger compartment, such as from passengers, or cargo, can also enter into the tracks and hinder, or prevent, the seats/carriages from properly sliding in the tracks.

Tracks can be formed to minimize these disadvantages. One such track will have a longitudinally extending box shape, with a slot or groove in the top. A carriage is provided which has a slide which is slidably mounted in the interior space of the box shape, and has an extension which extends from the slide through the slot, and up to the base of the seat to support the seat. An example of such a track and carriage arrangement is disclosed in US Patent Publication 2014/0091610, which is incorporated by reference in its entirety. While the track can be recessed into the floor of the passenger compartment, this still leaves the slot open to the passenger/cargo compartment, which still can be unsightly, interfere with activities, such as the shoes of the passengers, and is especially prone to collect debris. Collecting debris is especially disadvantageous, because it can prevent can hinder, or even completely prevent, the sliding of the seats in the track.

Covers are known for covering the slot in the track. However these covers can be difficult to manufacture, difficult to maintain, prone to failure, and inadequately prevent the slot from being unsightly, interfering with activities, and preventing debris from passing through the slot into the interior of the track.

Other covers are known for tracks, such as a cover used in Bugatti Factory Mechanical Track System and shown in the appendix.

U.S. Pat. No. 5,228,659 describes a vehicle seat assembly having an extending seat track trim cover for covering the end portion of the lower seat track when the seat assembly is adjusted to a full forward or full rearward seating position. This vehicle seat assembly has a cover which extends from the front and back of the seat to cover a portion of the track mounted on the vehicle when that portion of the track would be exposed, such as when the seat is in the foremost or rearmost position. This structure would not be suitable when the track mounted to the vehicle extends the full length of the passenger/cargo compartment, especially when there are a plurality of seats sliding on the same track or set of tracks. U.S. Pat. No. 5,228,659 is incorporated by reference in its entirety, especially for showing possibilities of how a carriage/slide can be movably mounted on a track on the floor of a vehicle.

U.S. Pat. No. 6,145,911 describes a track cover system with first and second cover elements adapted to be attached to the vehicle such that the cover elements are disposed on opposite sides of the track. The cover elements are engageable with each other. A slider slidably engages with the cover elements for engaging the cover elements together to thereby cover at least a portion of the track. The engaging and disengaging of the cover elements as the slide moves along the track, creates resistance to the movement of the seat. Also engaging and disengaging is prone to failure which can make the cover not cover the exposed track. U.S. Pat. No. 6,145,911 is incorporated by reference in its entirety, especially for showing possibilities of how a carriage/slide can be movably mounted on a track on the floor of a vehicle.

U.S. Pat. No. 6,511,032 describes a seat track protector assembly which covers the ends of the seat tracks in a vehicle. The cover for the ends of the seat track is positioned against either the end of the upper track or the end of the lower track, depending upon which end is the furthest rearward. This cover does not protect openings on the top of the track from interfering with passengers, or from debris entering the track. U.S. Pat. No. 6,511,032 is incorporated by reference in its entirety, especially for showing possibilities of how a carriage/slide can be movably mounted on a track on the floor of a vehicle.

U.S. Pat. No. 7,073,764 describes a seat track mechanism for a vehicle seat, which has a shutter means to prevent foreign material, such as dirt, dust and/or mud from going into stationary rails. The shutter means has an elongated endless belt. The elongated endless belt comprises a plurality of narrow strips that are disposed adjacent to one another and connected to one another by hinge pins. All of these narrow strips of the endless belt need to slide longitudinally in the stationary track, and rotate around the ends of the stationary track. This causes a great deal of friction and resistance to moving of the seat, especially when dirt gets into the sliding connection between the endless belt and the stationary rails. U.S. Pat. No. 7,073,764 is incorporated by reference in its entirety.

U.S. Pat. No. 8,393,590 describes a vehicle seat rail assembly that closes the groove portion of a lower rail. The grooved portion is closed by a movable cover and a stationary cover. The movable cover selectively overlaps the stationary cover depending on the position of the seat. When the movable cover only partially overlaps the stationary cover, portions of the groove of the lower rail are still exposed, and therefore U.S. Pat. No. 8,393,590 only partially covers the groove in the lower rail. Furthermore because of the overlapping arrangement, U.S. Pat. No. 8,393,590 is not suitable for tracks which have a length which is several multiples of the overall front to back length of the seat. U.S. Pat. No. 8,393,590 is incorporated by reference in its entirety, especially for showing possibilities of how a carriage/slide can be movably mounted on a track on the floor of a vehicle.

U.S. Pat. No. 9,399,413 describes a movable track cover and includes a cover segment mounted for movement transverse to the direction of tracks that carry a movable seat between first and second positions. Large sections of the track are exposed each time the cover is lifted, and require relatively large amounts of force when the seat is moved to lift a new cover. This is disadvantageous for making minute adjustments to the position of the seat. U.S. Pat. No. 9,399,413 is incorporated by reference in its entirety.

SUMMARY OF THE INVENTION

It is an object of the present invention to provide a vehicle seat assembly that can have a long track system, preferably greater than 1 meter in length, and possibly 3 meters or greater. The vehicle seat assembly of the present invention includes a cover that covers the slots exposed by the longer tracks, while having an improved package size (low profile) and craftsmanship, blending with an existing floor, maintaining smooth low sliding efforts, and minimizes debris from entering track. The present invention has a simplified manufacturing and assembly process, the cover passively opens and closes as track carriages move down tracks, and the cover is compatible to existing carriage/track assembly with little or no modification.

The present invention accomplishes this object by providing a vehicle seat assembly where the track is configured to be mounted in a vehicle, preferably recessed into the floor of the passenger and/or cargo compartment of the vehicle. The track has a longitudinal axis, preferably along the front to back direction of the vehicle. However, other orientations are possible. The inside of the track defines an interior space extending along the longitudinal axis. The track also defines a slot extending along the longitudinal axis, where the slot opens the interior space to an area outside of the track, preferably the passenger compartment where the seats will be arranged.

A carriage is movably mounted on the track along the longitudinal axis. The carriage has a slide mounted in the interior space of the track for sliding in the track. The track preferably has a U or C shape to hold the slide, and the accompanying seat, securely in the vehicle. Other shapes of the track are also possible. The carriage has a base support configured to support a base of the vehicle seat. The base support is arranged spaced from the track. The carriage also includes an extension connecting the slide to the base support, where the extension passes through the slot to connect the slide to the seat, and to securely hold the seat in the vehicle according to applicable safety requirements. The extension has longitudinal edges on diametrically opposite longitudinal sides of the extension.

A cover is mounted on the top of track. The cover includes a plurality of fingers, where each of the fingers is individually pivotally/rotationally connected to the track between a cover position and an open position for each finger. Each finger in the cover position blocks a portion of the slot from the area outside of the track, and each finger in the open position opens a respective portion of the slot to the area outside of the track. The open position of each finger provides the extension, and therefore the corresponding carriage and seat, a path to move in the track. The plurality of fingers and the longitudinal edges of the extension are shaped or configured to move the plurality of fingers from the cover position to the open position as one of the longitudinal edges moves along the longitudinal axis and against one of the plurality of fingers. After the extension has moved past one of the fingers, the one finger is configured to return to the cover position. This then allows the carriage to move in the track without interfering with the cover, and to have portions of the track which are not accommodating the carriage to be covered.

The track has first and second longitudinal slot sides defining first and second transverse sides of the slot. The plurality of fingers include a first set of fingers on the first slot side, and a second set of fingers on the second slot side. The first set of fingers extend from the first slot side across the slot, and the second set of fingers extend from the second slot side across the slot. Ends of the fingers extend preferably to the middle of the slot. This allows for simplified shaping of the fingers, and shaping the longitudinal edges of the extension, to create the pivoting movement of the fingers by longitudinal movement of the carriage. It is also possible for fingers to be on only one longitudinal slot side of the track and for the fingers to extend all the way across the slot, or the opposite fingers to extend different distances across the slot.

Each of the fingers include a protection portion and a pivotable portion. The pivotable portion pivotally connects the protection portion to the respective slot side. The pivotable portion is configured in one embodiment to deform for pivotal/rotational movement of a respective protection portion between the cover position and the open position due to movement of the carriage.

The possible seating arrangements can be increased by placing more than one seat on a set of tracks. In this way, all of the seats arranged on a set of tracks can be moved all the way to one end of the tracks, to the other end of the tracks, or to any position in between. Such possible arrangements of the seats in a vehicle are shown in the appendix. The carriages of the other seats are configured similar to the above described carriage, where the carriage of the other seats also moves the fingers of the track between the cover position and the open position as the carriage slides along the track.

The cover with the fingers does not need to cover the entire track, but only those portions of the track where the track would interfere with passengers, cargo or the cover is needed to prevent debris from entering the inside of the track. The cover with the fingers can be integrated into the track itself, such as being part of the top structure of the track, or the part of the track that forms the slot edges and defines the slot.

Alternatively, the cover can be a separate structure which is mounted on a track. The advantages of a cover as a separate structure is that the same design of track can be used in both long and short versions. In short versions, where the seat has limited mobility, and effectively and practically covers/protects the track, a cover with fingers is not needed. In the long version, where covering and protection is desired, the same design of track that was used in the shorter version, can be used in the long version, with the addition of the cover and the fingers described above.

The dimension of the fingers in the longitudinal direction of the track is relatively short compared with the longitudinal dimension of the carriage, or even the extension of the carriage, or even the longitudinal dimension of the longitudinal edge of the extension. It is also preferable that the fingers have a shorter dimension in the longitudinal direction of the track, than a longitudinal dimension of the extension. By having these dimensions, only small portions of the slot are opened at one time, or possibly no portion of the slot is opened to the surrounding environment at all. This minimizes interference between the open slot and the feet of an occupant, minimizes interference with cargo, and minimizes how much of the slot is opened at any one time which prevents debris from entering.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 is a perspective view of a vehicle seat on a track, with an expanded view of the ends of the track;

FIG. 2 is a perspective view of a carriage mounted in a track prior to the carriage coming into contact with the cover;

FIG. 3 is a front or rear view of the carriage in the track as the carriage passes through the fingers of the cover;

FIG. 4 is a perspective view of the carriage in the track as the carriage passes through the fingers of the cover;

FIG. 5 is a cross sectional view through the carriage and track according to view line V of FIG. 3;

FIG. 6 is a side view of the carriage and track as the carriage passes through the fingers of the cover;

FIG. 7 is a perspective view of one embodiment of a longitudinal edge of the carriage;

FIG. 8 is a perspective view of another embodiment of a longitudinal edge of the carriage.

DESCRIPTION OF THE PREFERRED EMBODIMENTS

Figure 9:
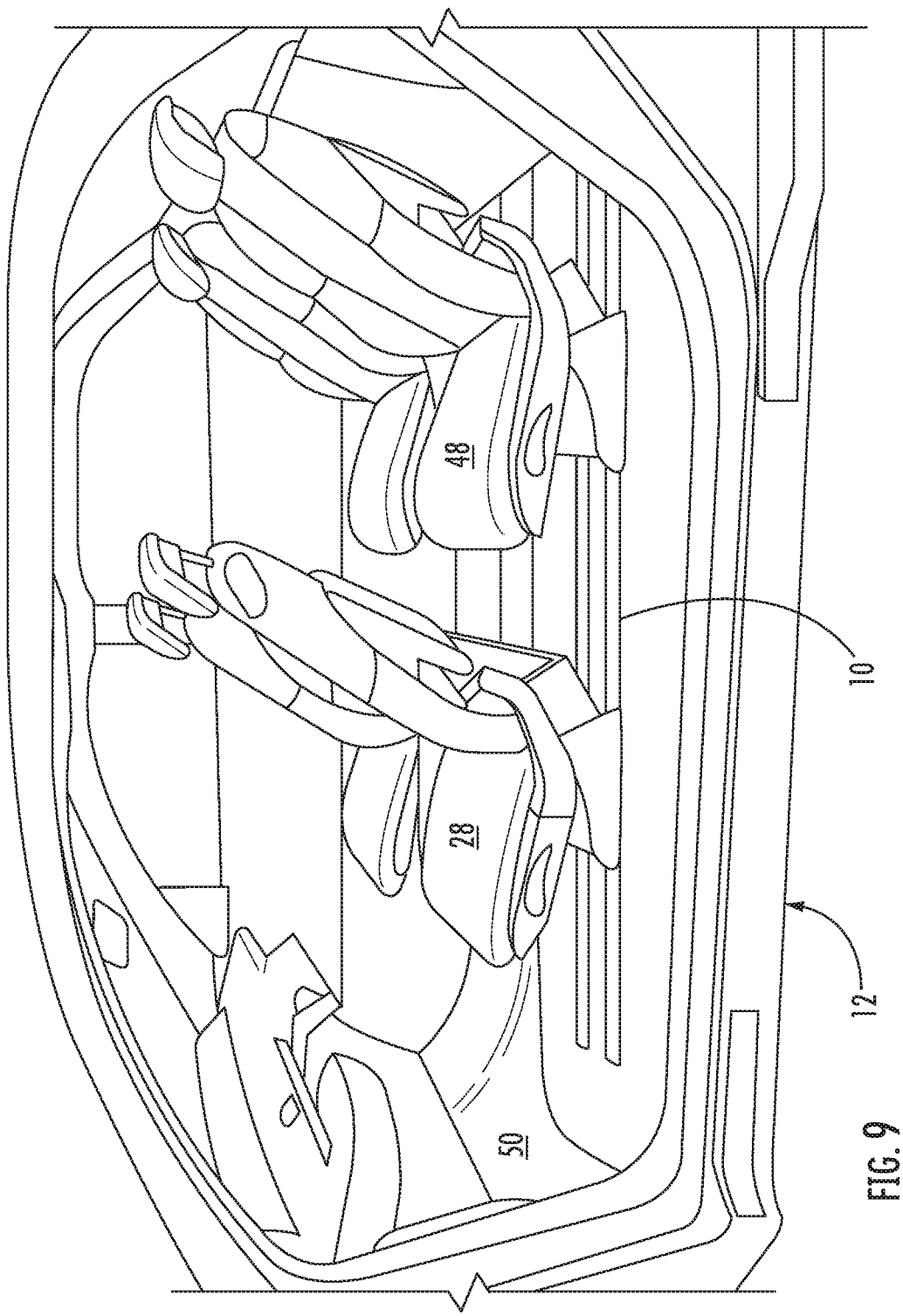
FIG. 9 is a side view of a passenger compartment of a vehicle showing seats in two front to rear columns being mounted on the same tracks.

Referring to the drawings in particular, FIG. 1 shows a seat 28 slidably mounted on a track 10 through a carriage 20. The track 10 is much longer than the front to back distance of the seat 28. In the embodiment of FIG. 1, the track 10 extends in front of the seat base 26, and would be in the leg area or foot well 50, of an occupant of the seat 28.

The track 10 defines an interior space 16 and a slot 18 which opens the interior space 16 to the area surrounding the track 10. Inside track 10, a slide 22 of the carriage 20 is slidable mounted onto the track 10, as schematically shown in FIG. 5. The carriage 20 includes an extension 30 which is connected to the slide 22, and extends away from the slide 22. The extension 30 passes through the slot 18, and the end of the extension 30 diametrically opposite the slide 22 has a base support 24 which attaches to the seat base 26 of the vehicle seat 28 to support the seat base 26 and the vehicle seat 28.

The slide 22 is contained in the track 10 in a known manner to both be slidable in the longitudinal direction 14 along the longitudinal axis 14, as well as to firmly secure the vehicle seat 28 to the vehicle 12 according to relevant safety standards. This is done in one embodiment of the present invention, by the track 10 having a U or C shape. Such a long/extended track arranged in the leg area or foot well 50 can interfere with the feet of an occupant, and interfere with the visual appearance. Such tracks can be recessed into the floor of the vehicle to reduce interference. The slot 18 then still interferes, and it can collect debris which can hinder operation of the carriage 20.

A cover 34 is mounted on the track 10 to reduce the interference caused by the slot 18. The cover 34 has a plurality of fingers 36 which extend from a slot side 42, and preferably both slot sides 42 which are on opposite transverse sides of the slot 18. These fingers 36 are pivotal or rotatable between a cover position 38 as is especially shown in FIG. 2, to an open position 40 as is especially shown in FIGS. 3-6. Each of the fingers 36 includes a protection portion 44 and a pivot or pivotable portion 46. The protection portion 44 has a wedge or trapezoidal shape extending downward from a top surface in a longitudinal cross sectional view, as shown in FIG. 5. Other shapes are also possible, such as curved shapes as well as a combination of straight edges and curves. The protection portion 44 has the top surface to cover the slot 18, and protect the slot 18, and the interior space 16 from the entry of debris. The top surface is flush or even over a plurality of fingers 36 to provide a smooth surface that will not interfere with passengers or cargo.

The extension 30 has longitudinal edges 32 on diametrically opposite longitudinal ends or sides of the extension 30. The longitudinal edges 32 and the fingers 36 are shaped so that when the carriage 30 slides along the longitudinal axis 14 and the longitudinal edges 32 come into contact with the fingers 36, the corresponding shapes of the bottom of the fingers 36 cause the fingers 36 to move from the cover position 38 to the open position 40. This allows the carriage 22 slide in the track 10 without damaging the fingers 36.

In the preferred embodiment of the drawings, fingers 36 have a wedge or trapezoidal shape. The longitudinal edges 32 have a slanted shape, so that when the edge 32 comes into contact with the finger 36, the protection portion 44 of the finger 36 rides up the edge 32. The protection portion 44 riding up the edge 32 causes the protection portion 44 to pivot about the pivot portion 46. The pivot portion 46 in the preferred embodiment is shaped and formed of a material to deform and guide the pivoting/rotation of the protection portion 44 into the open position 40. Pivot portion 46 can also be formed by other rotatable connections such as pin and sleeve. The shape and form of the material of the pivot portion 46 is preferably chosen so that the protection portion 44 is biased or held in the cover position 38 when the respective finger 36 is not in contact with the carriage 20. Longitudinal edges 32 can have different shapes as shown in FIGS. 7 and 8 to create the lifting and pivoting movement of the fingers 36.

The extension 30 between the longitudinal edges 32 is also shaped to keep the protection portions 44 in the open position when the extension 30 is in contact with the fingers 36, and the extension 30 slides past the fingers 36. The extension 30 has the edges 32 at diametrically opposite longitudinal ends of the extension 30, so that the fingers 36 can be moved out of the way as the carriage 20 slides forwards and backwards along the track 10. After the carriage 20 has passed a finger 36, the pivot portion 46 causes the protection portion 44 to return back into the cover position 38. This is preferably done by the pivot portion 46 being shaped and formed of a material to bias the protection portion 44 into the cover position 38. It is also possible, that the pivot portion 46 is shaped and formed of material, to have gravity cause the protection portion bias the pivot portion 44 into the cover position 38. Additional structure can also be provided to prevent the protection portion 44 from moving past the cover position 38, and move further into the slot 18 and/or the interior space 16.

The shape and material of the pivot portion 46 is carefully chosen to support the protection portion 44 in the cover position, and keep the protection portion in the cover position 38 so that debris is prevented from entering the track 10. The shape and material of the pivot portion 46 is also chosen to provide minimal resistance to the carriage 20 as the leading edge 32 contacts the respective protection portion 44. Choosing the shape and material of the pivot portion 46 then becomes a choice between the amount of support in the cover position 38, and the amount of resistance applied to the sliding of the carriage 20.

The cover 34 does not need to extend over the entire track 10, and can only be provided in areas where it would interfere with the occupants or the cargo, or where it is needed to prevent debris from entering into the track 10.

While specific embodiments of the invention have been shown and described in detail to illustrate the application of the principles of the invention, it will be understood that the invention may be embodied otherwise without departing from such principles.

LIST OF REFERENCE CHARACTERS 10 track
12 vehicle
14 longitudinal axis
16 interior space
18 slot
20 carriage
22 slide
24 base support
26 base of the vehicle seat
28 vehicle seat
30 extension
32 longitudinal edges
34 cover
36 fingers
38 cover position
40 open position
42 slot sides
44 protection portion
46 pivot portion
48 another vehicle seat
50 leg area or foot well

What is claimed is:

1. A vehicle seat assembly comprising:
a track configured to be mounted in a vehicle, said track having a longitudinal axis, said track defining an interior space extending along said longitudinal axis, and defining a slot extending along said longitudinal axis, said slot opening said interior space to an area outside of said track, said slot having a first slot side and a second slot side;
a carriage movably mounted on said track along said longitudinal axis, said carriage having a slide mounted in said interior space, said carriage having a base support configured to support a base of the vehicle seat, said support being arranged spaced from said track, said carriage including an extension connecting said slide to said support, said extension passing through said slot, said extension having extension front and rear longitudinal edges on diametrically opposite longitudinal sides of said extension, wherein said front and rear extension longitudinal edges each taper inwardly from a lower broader section, below the slot to an upper narrower section, above the slot, to define a front and a rear shaped ramp portion; and
a cover mounted on said track, said cover comprising a plurality of fingers comprising a first set of fingers associated with said first slot side and a second set of fingers associated with said second slot side, each of said fingers being individually pivotally connected to said track between a cover position and an open position, said each finger in said cover position extending from a respective slot side toward an opposite slot side and blocking a portion of said slot from the area outside of said track, said each finger in said open position opening a respective said portion of said slot to the area outside of said track, each of said plurality of fingers being shaped and configured with a top planar surface, wherein adjacent fingers in said cover position provide a continuous upper surface of adjacent top planar portions and each of said plurality of fingers being shaped and configured with a bottom tapered portion with a forward finger longitudinal edge and rear finger longitudinal edge arranged relative to each other to provide bottom ramp portions tapering from the top surface inwardly to a lower narrow section having a longitudinal dimension that is smaller than a longitudinal dimension of the top planar surface, wherein said finger rear longitudinal edge is engagable by the front shaped ramp portion to move an engaged finger from said cover position to said open position as the front shaped ramp portion moves forward relative to the respective engaged finger and said finger front longitudinal edges is engagable by the rear shaped ramp portion to move an engaged finger from said cover position to said open position as the rear shaped ramp portion moves rearward relative to the respective engaged finger.

2. A vehicle seat assembly in accordance with claim 1, wherein:
said first set of fingers extend from said first slot side across said slot;

said second set of fingers extend from said second slot side across said slot.

3. A vehicle seat assembly in accordance with claim 1, wherein:
each of said fingers includes a protection portion and a pivotable portion; and
said pivotable portion pivotally connects the protection portion to said respective slot side.

4. A vehicle seat assembly in accordance with claim 3, wherein:
said pivotable portion is configured to deform to pivot a respective said protection portion between said cover position and said open position.

5. A vehicle seat assembly in accordance with claim 3, wherein:
said pivotable portion is configured to deform to pivot a respective said pivotable portion between said cover position and said open position due to movement of said carriage.

6. A vehicle seat assembly in accordance with claim 1, further comprising:
a vehicle seat base mounted on said base support;
a vehicle floor on which said track is mounted.

7. A vehicle seat assembly in accordance with claim 1, further comprising:
another carriage movably mounted on said track along said longitudinal axis, said another carriage having a slide mounted in said interior space, said another carriage having a base support configured to support a base of another vehicle seat, said support being arranged spaced from said track, said another carriage including a extension connecting said slide to said support, said slide passing through said slot, said extension having longitudinal edges on diametrically opposite longitudinal sides of said extension;
said plurality of fingers and said longitudinal edges of said extension of said another carriage being shaped configured to move said plurality of fingers from said cover position to said open position as one of said longitudinal edges of said another carriage moves along said longitudinal axis against one of said plurality of fingers.

8. A vehicle seat assembly in accordance with claim 1, wherein:
said cover with said fingers is only mounted on a portion of said track.

9. A vehicle seat assembly in accordance with claim 1, wherein:
said cover with said fingers is only in a cargo area of the vehicle.

10. A vehicle seat assembly in accordance with claim 1, wherein:
said fingers have a shorter dimension in said longitudinal direction of said track, than in a transverse direction of said track.

11. A vehicle seat assembly in accordance with claim 1, wherein:
said fingers have a shorter dimension in said longitudinal direction of said track, than a longitudinal dimension of said extension.

12. A vehicle seat assembly in accordance with claim 1, wherein:
said fingers have a shorter dimension in said longitudinal direction of said track, than a longitudinal dimension of said extension.

13. A vehicle seat assembly in accordance with claim 1, wherein:
said fingers have a shorter dimension in said longitudinal direction of said track, than a longitudinal dimension of said longitudinal edges of said extension.

14. A vehicle seat assembly in accordance with claim 1, wherein:
said front and rear extension longitudinal edges are curved or straight or any combination of curved and straight to form the front and a rear shaped ramp portion; and
said forward finger longitudinal edge and said rear finger longitudinal edge are curved or straight or any combination of curved and straight.

15. A vehicle seat assembly in accordance with claim 3, wherein:
said cover further comprises a slot first side portion defining a surface adjacent to the first longitudinal slot side and a slot second side portion defining a surface adjacent to the second longitudinal slot side;
said pivotable portion pivotally connects the protection portion to the respective slot side portion, at least partially extends below the respective slot side portion, and has a reduced height region with a reduced height dimension relative to a height dimension of the protection portion; and
each reduced height dimension defines a clearance region allowing each said protection portion to move to said open position without said finger contacting a respective said slot first side portion and said slot second side portion.

16. A vehicle seat assembly comprising:
a track configured to be mounted in a vehicle, said track having a longitudinal extent with a longitudinal axis, said track defining an interior space extending along said longitudinal axis, and said track defining a slot extending along said longitudinal axis, said slot opening said interior space to an area outside of said track, said track having a first longitudinal slot side and a second longitudinal slot side;
a carriage movably mounted on said track along said longitudinal axis, said carriage having a slide mounted in said interior space, said carriage having a base support configured to support a base of the vehicle seat at location spaced from said track, said carriage including an extension connecting said slide to said support, said extension passing through said slot, said extension having extension front edges and extension rear edges on diametrically opposite front and rear longitudinal ends of said extension, wherein said extension front edges and said extension rear edges each taper inwardly from a lower broader section, below the slot, to an upper narrower section, above the slot, to define a front shaped ramp portion and a rear shaped ramp portion; and
a cover mounted on said track, said cover comprising:
a slot first side portion defining a surface adjacent to the first longitudinal slot side and a slot second side portion defining a surface adjacent to the second longitudinal slot side, the surface adjacent to the first longitudinal slot side and the surface adjacent to the second longitudinal slot side being in a common horizontal plane; and
a plurality of fingers comprising a first set of fingers adjacent to said first slot side and a second set of fingers adjacent to said second slot side, wherein:
each of said plurality of fingers is shaped and configured with a top planar surface;

each of said plurality of fingers is individually pivotally connected to said track for pivotable movement between a cover position and an open position;

each of said plurality of fingers in said cover position extends from a respective slot side toward an opposite slot side to block a portion of said slot from the area outside of said track;

in said cover position, said top planar surfaces of said plurality of fingers are directly adjacent to each other and in the common horizontal plane or in a plane parallel to the common horizontal plane;

in said open position, each of said fingers extends at an angle relative to said common horizontal plane;

each of said plurality of fingers is shaped and configured with a bottom tapered portion with a forward finger longitudinal edge and rear finger longitudinal edge, which are arranged relative to each other to provide each of the plurality of fingers with a bottom ramp portion tapering from the top surface inwardly to a lower narrow section having a longitudinal dimension that is smaller than a longitudinal dimension of the top surface;

said finger rear longitudinal edge is engagable by the front shaped ramp portion to move an engaged finger from said cover position to said open position as the front shaped ramp portion moves forward relative to the respective engaged finger;

said finger front longitudinal edge is engagable by the rear shaped ramp portion to move an engaged finger from said cover position to said open position as the rear shaped ramp portion moves rearward relative to the respective engaged finger;

each of said fingers include a protection portion and a pivotable portion;

said pivotable portion pivotally connects the protection portion to said respective slot side, portion and at least partially extends below the respective slot side portion and has a reduced height region with a reduced height dimension relative to a height dimension of the protection portion; and each reduced height dimension defines a clearance region allowing each said protection portion to move to said open position without said finger contacting a respective said slot first side portion and said slot second side portion.

17. A vehicle seat assembly in accordance with claim 16, wherein:

said front and rear extension longitudinal edges are curved or straight or any combination of curved and straight to form the front and a rear shaped ramp portion; and said forward finger longitudinal edge and said rear finger longitudinal edge are curved or straight or any combination of curved and straight.

18. A vehicle seat assembly in accordance with claim 16, wherein:

said pivot portion is configured to deform so as to pivot a respective said protection portion between said cover position and said open position.

19. A vehicle seat assembly in accordance with claim 16, wherein:

said fingers have a shorter dimension in said longitudinal direction of said track, than in a transverse direction of said track.

20. A vehicle seat assembly in accordance with claim 16, wherein:

said fingers have a shorter dimension in said longitudinal direction of said track, than a longitudinal dimension of said extension.

\* \* \* \* \*